United States Patent [19]
Avera

[11] Patent Number: 5,436,023
[45] Date of Patent: Jul. 25, 1995

[54] PROCESS FOR ROASTING FOOD SLURRIES

[75] Inventor: Fitzhugh L. Avera, Alameda, Calif.

[73] Assignee: PBFB Licensing Corporation, Burnsville, Minn.

[21] Appl. No.: 235,364

[22] Filed: Apr. 29, 1994

[51] Int. Cl.$^6$ .............................................. A23L 1/36
[52] U.S. Cl. ........................... 426/633; 426/466; 426/473; 426/516; 426/518; 426/519
[58] Field of Search ............... 426/633, 516, 518, 519, 426/466, 473

[56] References Cited

U.S. PATENT DOCUMENTS

| | | |
|---|---|---|
| 1,921,275 | 8/1933 | Werner .............................. 426/633 |
| 2,511,115 | 6/1950 | Lazier et al. ....................... 426/633 |
| 3,121,015 | 2/1964 | Avera .................................. 99/128 |
| 3,246,991 | 4/1966 | Avera .................................. 99/128 |
| 4,839,193 | 6/1989 | Mange et al. ....................... 426/633 |

Primary Examiner—Helen Pratt
Attorney, Agent, or Firm—Merchant, Gould, Smith, Edell, Welter & Schmidt

[57] ABSTRACT

A new method for roasting food slurries, such as those containing nuts and coffee beans. A slurry including raw food particles slurried in a fluid medium is provided. The slurry is roasted through high-friction grinding with frictional forces sufficient to raise the slurry to a roasting temperature.

14 Claims, 2 Drawing Sheets

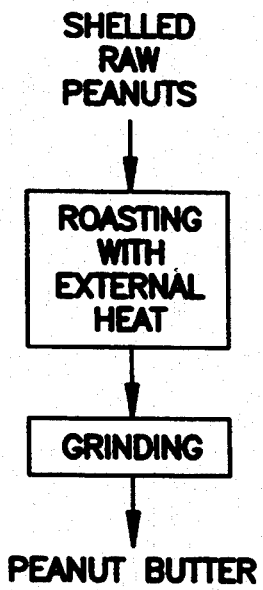
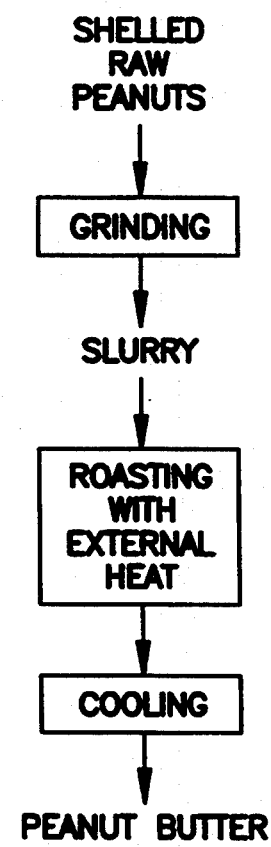
PRIOR ART
FIG. 1
PRIOR ART
FIG. 2

PROCESS FOR ROASTING FOOD SLURRIES

FIELD OF THE INVENTION

This invention relates generally to methods for roasting food slurries. More particularly, this invention relates to a new method for roasting food slurries, such as those containing nuts and coffee beans, through generation of friction.

BACKGROUND OF THE INVENTION

It is well known in the prior art that raw peanuts must be roasted in order to make peanut butter. The most common prior-art method of making peanut butter is schematically depicted in FIG. 1. Shelled raw peanuts are roasted by the application of external heat. The roasted peanuts are then ground to a consistency known as peanut butter.

The product resulting from this prior-art method suffers from several disadvantages. A first disadvantage results from the fact that peanuts are a poor conductor of heat. When peanuts are roasted prior to grinding, the periphery tends to become over-roasted and the center under-roasted, resulting in uneven roast flavors. A second disadvantage is that peanut butter produced in this manner will not "keep" as long. During grinding, peanut oil separates from peanut solids. Over time, the separated oil will oxidize, causing the peanut butter to have a rancid taste or odor. Another disadvantage is that the heat generated during comminution of the roasted peanuts is generally considered to be deleterious to flavor production. Yet another disadvantage is the pollution and loss of flavor that results from roasting whole raw peanuts by the application of external heat such as hot air furnaces. When peanuts are roasted in this way, a substantial amount of the peanut flavor escapes from roasting facilities, not only resulting in unnecessary peanut flavor loss, but also causing a potentially offensive odor to the surrounding community.

Applicant's U.S. Pat. No. 3,121,015 discloses a process for making peanut butter which solves some of the problems associated with roasting prior to grinding. This method is schematically depicted in FIG. 2. Shelled raw peanuts are ground to a slurry of comminuted peanut particles and peanut oil. Although some heat is generated during grinding, the heat is insufficient to raise the temperature of the slurry to a roasting temperature. Therefore, external heat is applied in the form of, for example, a stirring kettle or dielectric heaters to raise the temperature of the slurry to a roasting temperature. Once a sufficient amount of time has passed to develop the desired roast flavor, the slurry is rapidly cooled by for example introducing a refrigerated coolant into the stirring kettle jacket.

While applicant's prior art process overcomes some of the problems associated with roasting prior to grinding, it also suffers from certain disadvantages. Most notably, it is difficult to evenly heat the slurry with external heat. This is particularly true when trying to produce large quantities of peanut butter in a commercially practicable process. Even when the slurry is stirred, the outer portions tend to become over-roasted and the center portions under-roasted, resulting in uneven roast flavors. Therefore, in order to obtain the advantages of roasting after grinding using this method, it is necessary to make smaller batches, and numerous external heat apparatuses for roasting are required to produce substantial quantities. There would thus be substantial cost savings if the roasting could be accomplished in a commercially practicable way that does not require numerous external heat apparatuses. Another problem associated with roasting with external heat is the tendency for particle solids to stick to the heating surface as a result of proteins being charred by overheating.

The same shortcomings exist in the prior art methods of making nut butters other than peanut butter. Examples include almond butter and cashew butter. Similar disadvantages are also found in the prior art methods of roasting other food slurries which contain nuts, as for example beverage flavor bases.

It is also well known in the prior art that coffee beans must be roasted before being made into coffee. However, the prior art method of roasting whole coffee beans with external heat suffers from similar disadvantages as that of roasting peanuts. These disadvantages primarily include the development of uneven roast flavors and the flavor loss and pollution which result from roasting with external heat.

What has been needed is a peanut butter and a simple process for making peanut butter which overcome the problems associated with roasting prior to grinding, including uneven roast flavors and premature oxidation, and which is commercially practicable. What has also been needed is a process for roasting food slurries, such as those containing nuts and coffee beans, which overcomes the problems associated with prior art methods.

SUMMARY OF THE INVENTION

According to one aspect of the present invention, a peanut butter and method for making peanut butter are provided.

In the method of making peanut butter of the present invention, a slurry including comminuted raw peanuts entrained in vegetable oil is provided. Where the term "raw" is used herein to describe peanuts, this term is intended to include not only peanuts which have not been roasted but also peanuts in every condition short of being completely roasted.

The slurry is roasted through high-friction grinding. The frictional forces generated during grinding are sufficient to raise the temperature of the resulting effluent to a roasting temperature. After a period of time sufficient for developing the desired roasted flavor, the effluent is cooled to below roasting temperatures.

In the peanut butter of the present invention, roasting raw peanuts slurried in vegetable oil by the application of high frictional forces produces an improved peanut butter. The improved peanut butter possesses a full-bodied roast flavor of enhanced uniformity and which is substantially free from under-roasted and over-roasted flavors. It is also more resistant to aging in that the amount of separated vegetable oil is minimized, thus reducing the potential for oxidation and resulting rancidity.

Another advantage of the present invention is that the taste and age-resistant advantages of roasting after grinding can be obtained in a commercially practicable production process. This is so because the processing machinery required for generating the necessary high-friction forces is commercially available and lends itself well to a mass production process.

According to another aspect of the present invention, a method for roasting food slurries is provided. In this method, a slurry including raw food particles slurried in a fluid medium is provided. The slurry is roasted through high-friction grinding with frictional forces sufficient to raise the temperature of the resulting effluent to a roasting temperature. After a period of time sufficient for developing the desired roast flavor, the effluent is cooled to below roasting temperatures. A variety of foods can be roasted according to this method, including for example nuts and coffee beans, to produce a variety of end products, including for example peanut butter, almond butter, cashew butter, coffee and beverage flavor bases. The method could also be possibly used for roasting coca beans. A variety of appropriate fluid media could be used.

These and other advantages and features of novelty which characterize the invention are pointed out with particularity in the claims annexed hereto. However, for a better understanding of the invention and its advantages, reference should be made to the drawing which forms a further part hereof, and to the accompanying descriptive matter in which there is illustrated and described a preferred embodiment of the present invention.

BRIEF DESCRIPTION OF THE FIGURES

FIG. 1 is a schematic diagram of a prior-art process for making peanut butter.

FIG. 2 is a schematic diagram of another prior-art process for making peanut butter.

DETAILED DESCRIPTION OF THE PREFERRED EMBODIMENT

Figure 3:
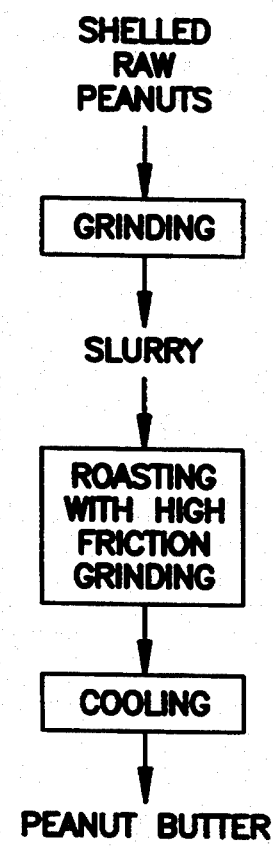
FIG. 3 is a schematic diagram of a process for making peanut butter according to the present invention.

Referring now to FIG. 3, there is depicted a schematic diagram of a process for making peanut butter according to the present invention. The invention is adaptable to batch or continuous processing or a combination thereof. The process can also be contained within a closed or partially closed system so that exposure to the atmosphere is minimized. It can be used with or without gravitational stabilizers, such as hydrogenated oil, for preventing or inhibiting oil stratification.

In the preferred embodiment, a slurry of raw peanuts entrained in vegetable oil is produced by grinding shelled raw peanuts. Preferably, prior to grinding, the peanuts are first dried to a residual moisture content of approximately 2% or less by weight, which allows for more effective blanching and more desirable plasticity during roasting. The peanuts are then preferably blanched to remove the red skin, and if desired the peanut nibs are also removed. Preferably the peanuts are ground to provide a slurry of comminuted peanuts and peanut oil to a consistency comparable to finished peanut butter in the prior art process where peanuts are roasted prior to grinding. This grinding is preferably accomplished by passing shelled dried peanuts through attrition mills, such as the metal serrated plate mills manufactured by Bauer Brothers or the stone plate mills manufactured by Morehouse.

It will be understood by those skilled in the art, however, that the slurry could be produced in a variety of other ways. For example, dry ground peanut particles could be added to peanut or other vegetable oil to form the slurry.

Prior to roasting, controlled amounts of air in the form of bubbles can optionally be entrained in the slurry for purposes of developing flavor. The amount of air which is deliberately entrained is dependent upon the type of peanuts used, their moisture content, and the flavor which is desired. While some degree of oxidation is required for flavor development, over-oxidation can lead to free radical formation and rancidity. In the preferred method, air is entrained in the slurry by mixing the slurry to a desired foam. However, this could be accomplished in other ways, such as blowing air bubbles into the slurry from below.

In accordance with the present invention, the slurry is roasted through high-friction grinding. Although this can be done immediately after the raw peanuts are ground into a slurry, it may be preferable to allow the slurry to cool from the heat which is generated during grinding. This may allow for better control of the roasting temperature of the effluent produced by the high-friction grinding.

Commercially available equipment used in the food processing industry would be suitable for generating the high frictional forces necessary to raise the slurry to a roasting temperature. A very promising apparatus for this task is a homogenizer, such as those manufactured by Waukesha Fluid Handling or Gaulin. In this application, the temperature of the effluent exiting the homogenizer could be controlled by adjusting the discharge valves to an appropriate pressure.

An extruder, sometimes referred to as an "expander," such as that manufactured by Anderson International Corporation, could also be used. Similar to a homogenizer, the discharge valve of an extruder could be loosened or tightened to control the degree of friction and therefore heat generated in the peanut slurry.

Other equipment which may be suitable could include stone mills or roller mills, although there may be a heat control problem with stone mills, and roller mills may not be capable of generating sufficient friction to create the necessary roasting temperatures. Still other equipment could be employed within the principals of the invention which is sufficient to raise the slurry to a roasting temperature through the generation of frictional forces.

In accordance with the present invention, the frictional forces must be sufficient to raise the temperature of the slurry to a roasting temperature, and thus completely roast the slurry. The preferable roasting temperature is approximately between 340° and 400° F. However, some skilled in the art believe that roasting can be accomplished at temperatures as high as 450° F. or higher, and that some roasting still occurs at temperatures as low as 300° F. The particular peak temperature and the time period during which the effluent is within the range of roasting temperatures will depend on a number of factors, including moisture content and the quality of peanuts used, as well as the desired roast flavor. The degree of roasting which is optimum is generally judged subjectively through visual observation and taste evaluation, and acceptable roast flavors are known by those skilled in the art. However, typical roasting times will be in the range of one to two minutes.

Next the effluent must be cooled to below roasting temperatures. Preferably, the effluent is cooled to below 100° F. Cooling can be accomplished in a number of ways, as for example by use of a scraped wall peanut butter cooler such as the well known Votator. A scraped wall cooler is preferred because of its ability to lower the temperature of the effluent to below roasting temperatures relatively quickly. Normally, the cooled roasted effluent would then be passed through a transfer pump, which pumps the effluent to a filling machine.

A peanut butter which results from the present invention represents an improvement over the prior art in several respects. The flavor of the improved peanut butter is full-bodied and of enhanced uniformity in that it is substantially free from under-roasted and over-roasted flavors as compared to peanut butters made from prior art processes. The improved peanut butter of the present invention also has a longer shelf life. It is more resistant to aging because peanut butter produced according to the present invention is less likely to have separated oil which can oxidize and in turn cause rancidity. Finally, the present invention allows one to take advantage of the benefits resulting from roasting after, rather than before, grinding in a commercially practicable process.

The method of the present invention could also be used for roasting other food slurries comprising food particles slurried in a fluid medium. For example, other nut butters, such as almond and cashew butter, could be produced according to the method, using the appropriate roasting temperatures and times as are known by those skilled in the art. The method could also be used to make beverage flavor bases, such as peanut butter flavor base, as is known in the art.

Another application of the method of the present invention is in the roasting of coffee beans. Like nuts, coffee beans are poor conductors of heat, and prior art roasting methods result in over roasted and under roasted flavors.

In the preferred method of roasting coffee beans, whole raw coffee beans are ground with an attrition mill such as that used with nuts. Bean solids should be sufficiently ground until bean particles which will pass through a standard No. 150 to No. 200 sieve are obtained. These fine particles are then slurried in potable water to a concentration of approximately 50 percent by weight. The slurry is then passed through a homogenizer, such as that used with nuts. As in the nut method, the roasting temperature can be controlled by the operator by using appropriate discharge valve settings. Preferably, the slurry exiting from the homogenizer is kept under pressure sufficient to prevent the water from boiling. After a period of time sufficient to develop the desired roast flavor, the effluent is cooled to below roasting temperatures using for example a refrigerated cooler. The effluent is then pumped to a filling machine. The resulting product is a coffee concentrate which could be used to make brewed or instant coffee. The product could also be dehydrated to make dry coffee grounds for brewing or instant coffee.

It should be understood that the present invention is not limited to the preferred embodiments discussed above, which are illustrative only. Changes may be made in detail, including the substitution of other foods, the order or elimination of steps, or changes in the equipment employed in the preferred embodiment, within the principals of the invention to the full extent indicated by the broad general meanings of the terms in which the appended claims are expressed.

What is claimed is:

1. A process for making peanut butter comprising the step of subjecting raw peanuts slurried in vegetable oil to frictional forces that create sufficient heat to completely roast the peanuts.

2. A process for making peanut butter according to claim 1, wherein the frictional forces are generated by passing the slurry through a homogenizer.

3. A process for making peanut butter according to claim 1, wherein the frictional forces are generated by passing the slurry through an expander.

4. A process for making peanut butter according to claim 1, wherein the frictional forces are generated by passing the slurry through a stone mill.

5. A peanut butter prepared by the process of claim 1.

6. A process for making peanut butter comprising the steps of:
   (a) providing a slurry including raw peanuts and vegetable oil;
   (b) grinding the slurry to produce an effluent, wherein frictional forces during grinding being sufficient to raise the temperature of the effluent to a roasting temperature; and
   (c) cooling the effluent after the effluent has been sufficiently roasted.

7. A process for making peanut butter according to claim 6, wherein the slurry is made by grinding whole raw peanuts to produce comminuted peanuts slurried in peanut oil exuded during grinding.

8. A process for making peanut butter according to claim 6, further comprising the step of entraining controlled amounts of air in the slurry prior to the step of grinding in order to develop flavor in the peanut butter.

9. A process for making peanut butter according to claim 8, wherein the step of entraining controlled amounts of air comprises mixing the slurry with sufficient intensity to create a foam.

10. In a process for making peanut butter wherein raw peanuts slurried in vegetable oil are roasted, the improvement comprising generating a temperature necessary for roasting through frictional forces created during grinding.

11. A process for making a nut food product comprising the step of subjecting raw nuts slurried in vegetable oil to frictional forces that create sufficient heat to completely roast the nuts.

12. A process for making a nut food produce according to claim 11, wherein the nuts are peanuts.

13. A process for making a nut food product according to claim 12, wherein the process is used to make peanut butter.

14. A process for making roasted coffee comprising the step of subjecting coffee beans slurried in water to frictional forces that create sufficient heat to completely roast the coffee beans.

* * * * *